D. G. LITTLEFIELD.
Base Burning Stove.
No. 1,823. Reissued Nov. 22, 1864.
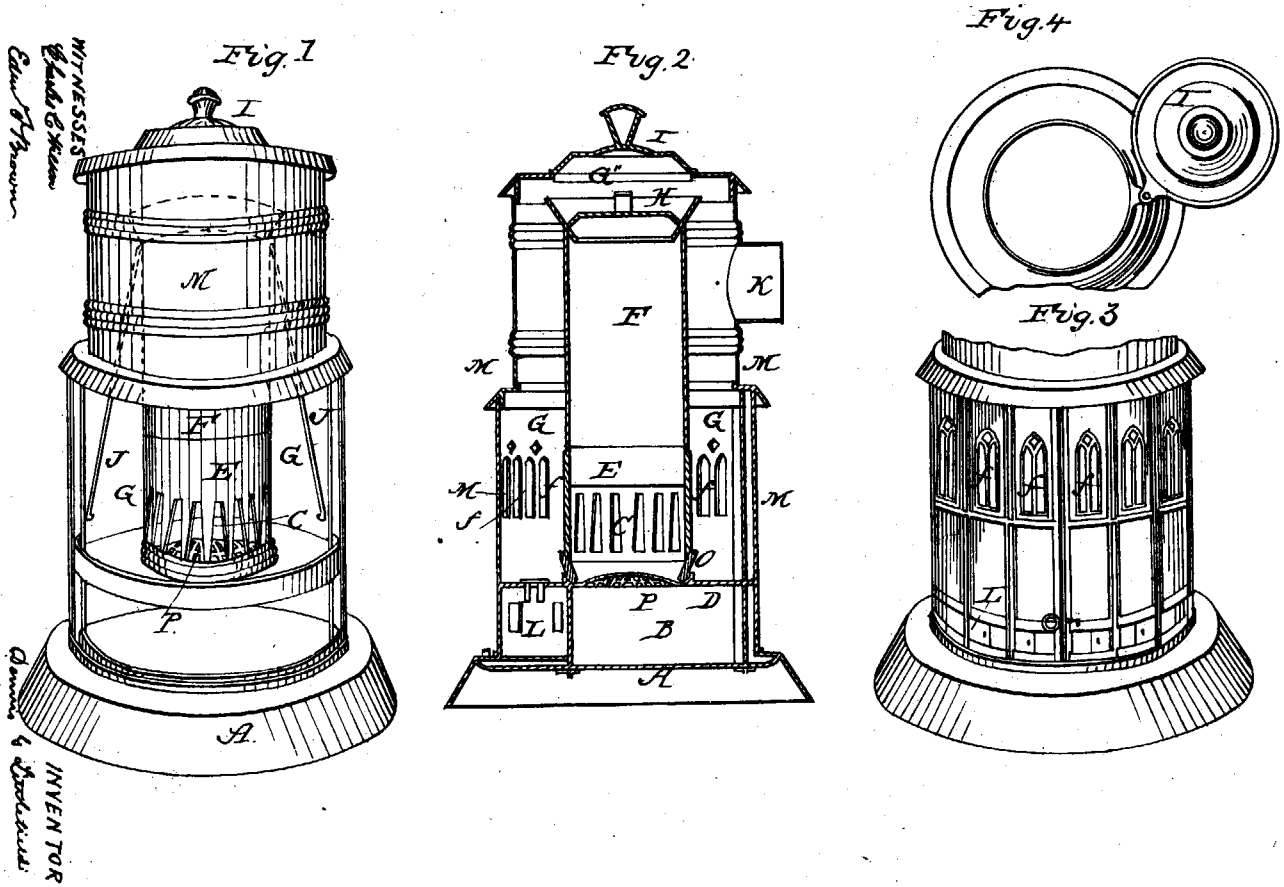
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,133, dated August 26, 1862; Reissue No. 1,479, dated May 19, 1863; Reissue No. 1,823, dated November 22, 1864.

DIVISION No. 4.

*To all whom it may concern:*

Be it known that I, DENNIS G. LITTLEFIELD, of Albany, in the county of Albany and State of New York, have invented new and useful Improvements in Stoves for Burning Anthracite and other Concentrated Fuels; and I do hereby declare the following to be a full, clear, and exact description of my invention, when taken in connection with the accompanying drawings and the letters of reference marked thereon, and which said drawings constitute part of this specification, and represent. in—

Figure 1, a perspective view of a cylindrical stove or section of the outside casing removed to show the fire-pot; Fig. 2, a vertical central section of Fig. 1, showing the combination and arrangement of the various parts and their connection and adaptation to each other, as here organized; Fig. 3, an illuminating-case, showing the arrangement thereof when combined with a stove in which a portion of its surface would be concealed by being placed against a wall or otherwise; and in Fig. 4 a plan view of the top of the stove and cover-opening thereto.

Similar letters indicate corresponding parts in the several figures.

My invention relates to an improvement in stoves which are supplied with an excess of fuel and the excess or reserve fuel fed to the fire as fast as consumption takes place, and for which I have applied for Letters Patent in even date herewith; and my invention consists in the adaptation of a swinging cover to the top of the stove, so as to permit said cover to be swung open on a horizontal plane without falling off when necessary to supply or to cool the stove.

In the drawings, A is the base; B, the ash-pit; P, the fire-grate; O, the base of the fire-pot; E, the fire-pot; C, openings in the fire-pot through which the gaseous products of combustion and light from the burning coals pass to the chamber G. M M is the outer case of the chamber G. F is the supplying-cylinder; H, the cover to the same; I, the cover to the chamber G″; L, the air-supply register, and K the smoke-flue.

The cover I, which forms the subject of this invention, is hinged to the top of the stove by a rivet, as seen in Fig. 4, so that it may be swung aside on a horizontal plane, as thus represented, without its becoming detached and falling off whenever it may be required to open the chamber G″ or to supply fresh coal, cool the stove, or for other purposes.

Having thus fully described my invention, I do not broadly claim hinging a cover to the top-plate of a stove; but

What I do claim as my invention, and desire to secure by Letters Patent, is—

The arrangement, adaptation, and combination, with a fuel-supplying stove, of a cover so hinged to the top plate of the stove that it may be swung open on a horizontal plane, substantially in the manner and for the purposes specified.

DENNIS G. LITTLEFIELD.

Witnesses:

CHARLES C. WILSON,
EDM. F. BROWN.